3,550,110
REMOTE INDICATION, MEASURING AND
CONTROL OF DIODES AND CONTROLLED
RECTIFIERS
Ferdy Mayer, 8 Boulevard Gambetta,
38 Grenoble, France
Filed Oct. 13, 1966, Ser. No. 586,532
Claims priority, application France, Oct. 13, 1965,
4,840
Int. Cl. G08b 21/00
U.S. Cl. 340—248                                    11 Claims

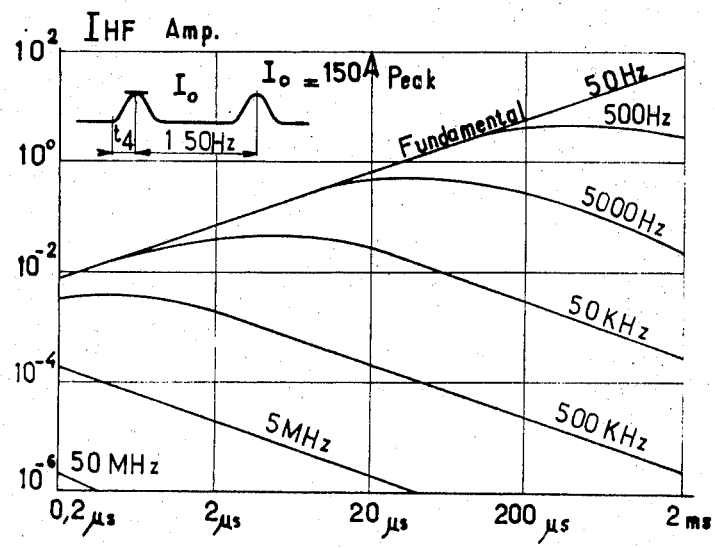
FIG.2
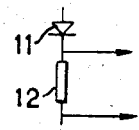
FIG.3a
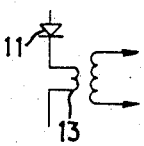
FIG.3b
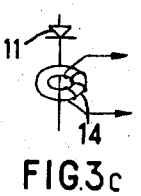
FIG.3c
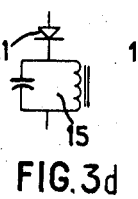
FIG.3d
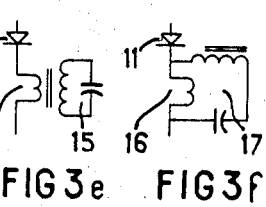
FIG.3e  FIG.3f
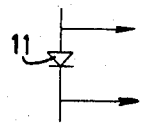
FIG.4a
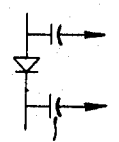
FIG.4b
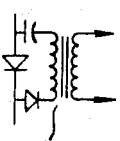
FIG.4c
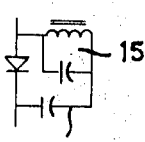
FIG.4d
FIG.7
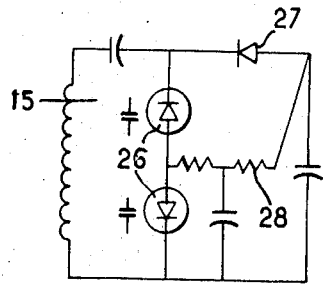
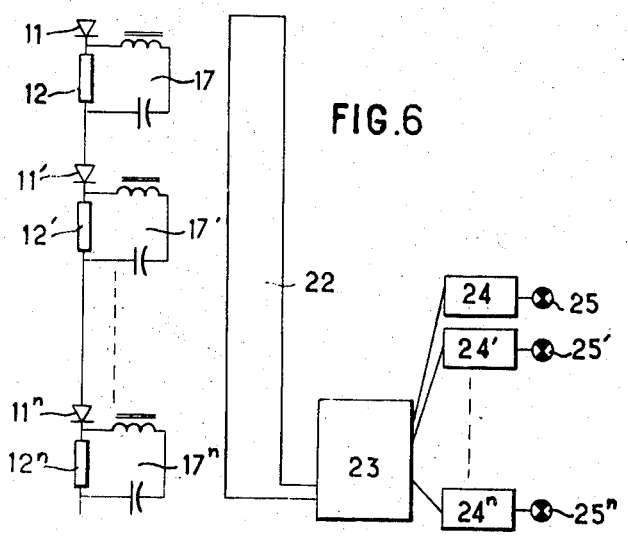
FIG.6
INVENTOR
Ferdy Mayer
BY Spencer & Kaye
ATTORNEYS United States Patent Office 3,550,110
Patented Dec. 22, 1970

ABSTRACT OF THE DISCLOSURE

A method and apparatus for monitoring the operating state of an electronic switching element of the type whose switching transient response has a high frequency component, the monitoring being effected by isolating a portion of the spectrum of such component, radiating a signal derived from such portion, and receiving the radiated signal at a distance from the radiation source.

BACKGROUND OF THE INVENTION

The use of semi-conductors as rectifiers, either of the fixed or of the controlled type, in high power systems is essentially determined by the possibilities of connecting these elements in parallel and in series to operate with large currents and high voltages. It is desirable to know, at each moment and at remote location, the operating state of each of these elements in order to verify from this information that the apparatus is operating properly and in particular to avoid major breakdowns which tend to set up a chain reaction of failures in the system.

It is desirable, for example, to provide such information for the remote indication, measuring and/or control of diodes and controlled rectifiers, such as the controlled rectifiers feeding, at rather high voltages, the motors of an electric locomotive, very high power inverters, and high power turbo-alternators wherein the excitation is provided by an auxiliary alternator combined with rectifiers mounted on their rotating member.

In the latter case it is desirable not only to obtain an indication of the state of the diodes (or the fuses in series therewith), but also to avoid the difficulty of a transmission occuring from semiconductor elements in constant rotational movement.

Different techniques have been used up to now, such as the use of fuses in series with visual indicators and the photoelectric reading of such indicators, or solenoids energized by a voltage arising as the result of a fault (or the absence of a fault) and reading by static or dynamic magnetic gauges, or independently fed micro-emitters.

These techniques are inconvenient in that they necessitate large quantities of apparatus of limited reliability requiring independent energy sources, and in particular when the semiconductors are moving, they only permit a periodic sampling of their indications.

SUMMARY OF THE INVENTION

It is a primary object of the present invention to permit such information to be attained in a simple and reliable manner.

The present invention stems from the following basic idea. All the circuits using power semiconductors (simple diodes, diodes controlled by unilateral or bilateral excitation, gas discharge tubes, as well as transistors, Shockley diodes, etc.) conduct currents having wave forms comprising at least one rapidly varying portion and this gives rise, across the devices, to variable voltages having a polarity determined by the direction of current flow (due to their more or less unilateral conduction) and having rapidly varying wave forms.

These rapidly varying wave forms can derive from an external electric circuit (for example switching in a multiphase rectifier circuit), or from certain phenomena peculiar to semi-conductors (for example switching in a diode, with reverse current due to the recovering of the electric charge stored near the junction of the diode).

Now, all rapid variations of current or voltage correspond to a very well defined frequency spectrum. This spectrum has frequency components whose values become higher as the variation rapidity increases, and extends as far as high frequencies. It is sufficient to select, by an oscillating circuit for example, a particular frequency of the spectrum for each element of the circuit, and to provide an element of this oscillating circuit which acts as a radiating aerial (for example capacitance acting by coupling with an electrode, or an emitter, or again self-inductance acting by inductive coupling or as a loop transmitting aerial), in order to have a passive transmission system controlled by the current or voltage of the circuit and by the state of the elements such as diodes, fuses, etc.

Numerous possibilities of proportional or on-off remote measuring or indicating result, making possible remote control. Moreover, different techniques of putting these ideas into effect will be described hereafter with the aid of non-limitative examples.

In order that the principles of using rapidly varying wave forms may be better understood, there will first be considered a common three-phase, non-controlled power rectifier bridge arrangement (not shown) discharging into an inductive load. FIG. 1a illustrates the waveforms 30', 30" and 30''' of the feed voltage waves across the inductive load 31, FIG. 1b shows the current curves of each phase diode, and FIG. 1c shows the voltage waveform curve across one of the diodes as a function of time. The different phases 1, 2, 3 supply a total rectified current to a load which is supposed to be sufficiently inductive to render this current perfectly constant. At a time $t1$, when the voltages of phases 1 and 2 are equal, the diode of phase 2 starts to conduct since it is then biased in its forward conduction direction. This gives rise to a short-circuit current between the diode of phase 1 and the diode of phase 2, fed by the difference in voltage between the phases 1 and 2 at that moment. The rise time of this current is determined by the leakage inductance of the feed, and its direction of travel is such that it acts to reduce the current in diode 1 and correspondingly increase that in diode 2. During this "switching" the current of the two phases 1 and 2 recover, and corresponding time $t1$–$t3$ is the recovery time or switching time.

The decrease in current in the diode 1 between $t1$ and $t2$ is very rapid: for normal values of leakage inductance this time is of the order of a millisecond. It is given by the formula:

$$\frac{di}{dt} = -\omega I_\text{p} \frac{\sin \phi}{1-\cos \phi}$$

$$\text{with } \phi = 2 \arcsin \sqrt{\frac{I_\text{p} X}{2E \sin \frac{\pi}{p}}}$$

where:

$\omega$ is the angular frequency of the feed current
$I_\text{p}$ the forward current in the phase before switching
$\phi$ the phase angle of switching
$X = 2\pi L$ the total leakage reactance for the short circuit current
$E$ the feed voltage in V eff
$p$ the number of phases.

The frequency spectrum resulting from the relatively rapid slope of this decrease, as well as that of the rapid increase across the diode 1 after switching, is used as a source of a high frequency signal according to the invention.

Another important effect is that at the instant $t2$, when the current in the diode 1 has fallen to zero, the short circuit current referred to continues to flow in the diode 2 in the forward direction and through the diode 1 in the reverse direction until the latter has completely recovered its reverse blocking ability at the instant $t3$. The time interval $t2-t3$ is called the reverse recovery time of the diode in switching and lies within the range 20 to 200 μsec. for ordinary diodes, and can be several fractions of a μsec. for diodes having a rapid recovery time. At the end of this period, the charges stored by the concentration of minority carriers flow away and the current in the diode falls rapidly to zero during a very short time, of the order of 0.1 to 1 μsec.

The spectrum accompanying this variation is also used as a source of high frequency signals according to the invention.

At this instant, another interesting phenomenon occurs: the loads in the semiconductor, combined with those of the capacitance of the diode and any external capacities, form with the leakage inductance, an oscillator circuit. The oscillating discharge, strongly damped, which appears in the final current of the diode 1 and in the reverse voltage across it, can be used directly as a high frequency signal in accordance with the present invention. In fact, its frequency is in the range of 10 kHz. to 1 mHz., for usual capacity and leakage inductance values.

It is emphasized above that the rapid variation slopes give rise to spectrum components of high frequencies. In FIG. 2, are shown several amplitude values of HF components (in amperes), with respect to a fixed reference frequency equal to 50 Hz., and a peak amplitude of 150 a., as a function of rise time $t4$ (corresponding to the times indicated), with the frequency being taken as a parameter.

It will be seen that by using the decrease of current at switching one can obtain currents of a fraction of one ampere at 5000 Hz. and of a fraction of one tenth of one ampere at 50 kHz. In the same way, one can obtain currents of several ma. at around 500 kHz., owing to the rapid decrease of reverse current discharge of the diode. For each type of current variation determined, as aforesaid, by the leakage inductances, by the forward current in the diode before switching, by the feed voltage and its frequency, by the number of phases, by the characteristics of the diode, and, finally, by the external inductance or capacities provided for this purpose, there is an optimum frequency range where the available energy is at a maximum, these frequencies being particularly favoured for their use as remote measuring and indicating signals.

The principles set out above, in relation to a well-known rectifier, are applicable in the same way to any other circuit in which similar phenomena occur and in particular to controlled rectifier circuits, to transistors and all sorts of gas discharge tubes such as mercury valves, thyratrons, ignitrons, etc.

BRIEF DESCRIPTION OF THE DRAWINGS

FIGS. 1a–1c and 2 are diagrams already described in connection with the principles of the invention;

FIGS. 3a–3f are simplified circuit diagrams of several arrangements for taking off and transmitting a signal proportional to the current in each rectifier element;

FIGS. 4a–4d show several arrangements for taking off and transmitting a signal proportional to the voltage across each rectifier element;

FIG. 6 shows an arrangement which employs the principles of the invention for remote indication with several parallel or simultaneous channels;

FIG. 7 shows an embodiment of the invention for effecting a remote measuring proportional to the amplitude of the wave forms by frequency modulation.

DESCRIPTION OF THE PREFERRED EMBODIMENTS

Figure 1A:
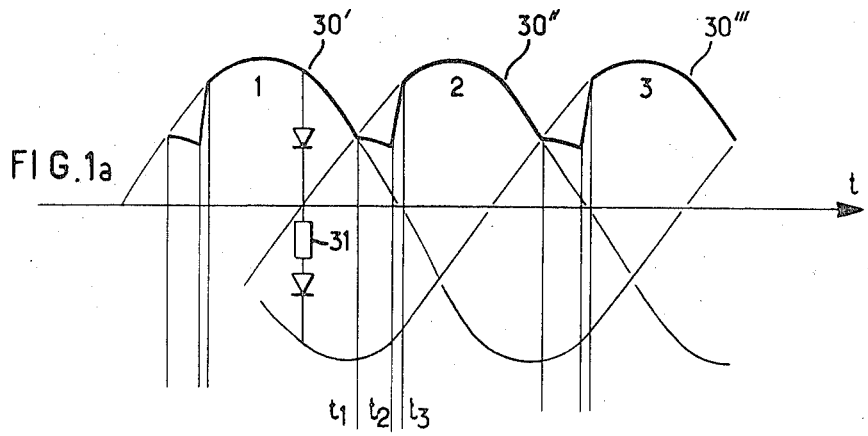
Figure 1B:
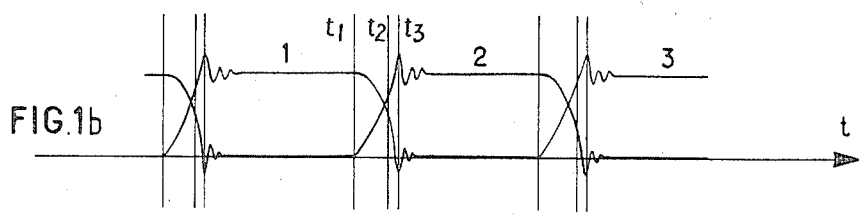
Figure 1C:
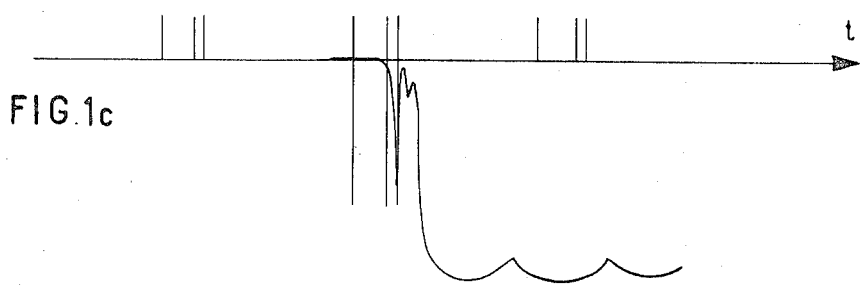

FIG. 3a shows diagrammatically how a signal proportional to a current is taken off across the resistor element 12 which can be a simple fuse for example. In FIG. 3b the signal is taken off by a transformer 13 which is shown in its simplest form in FIG. 3c, that is to say as a current transformer 14 inductively coupled to the main lead of the diode 11. FIGS. 3d, 3e and 3f show how a simple selective circuit 15, 17 can be formed, excited in series or parallel by conductive coupling (FIGS. 3d and 3f) by inductive coupling (FIG. 3e) or even by capacitive coupling. The inductances can have a magnetic core, which arrangement acts as a transmitting aerial, or the tuning capacities can be used for an electric coupling with the receiver. Further examples will be given hereunder.

In FIG. 4, a signal proportional to the voltage across the rectifier element is taken off directly (FIG. 4a) or across coupling capaictors 18 (FIG. 4b) or again across a coupling inductance 19 (FIG. 4c), an arrangement in which an additional diode permits coupling of the desired polarity, corresponding to the rapid variation of the reverse voltage. FIG. 4d shows the application of the coupling capacitor 20 to a simple resonant circuit 15 which selects and radiates the desired frequency.

Figure 5:
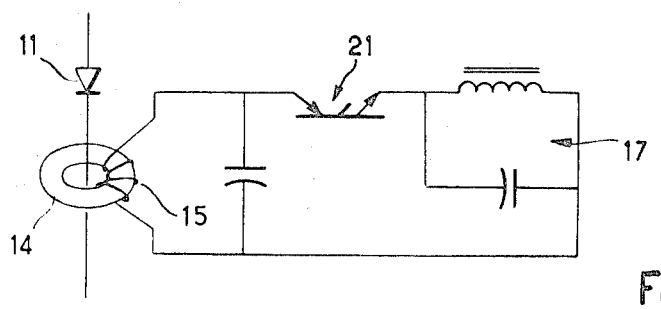
FIG. 5 shows an embodiment of the invention for taking off and transmitting a signal proportional to the current in each rectifier element with the independent use of excitation with a high frequency spectrum.

These different possibilities, each itself well-known, can be combined to provide the best solution to a given problem. Moreover, one can add to the circuit active elements which, without having a particular feeding source (that is to say without acting as an independent oscillator necessitating an independent feed) allow a particular frequency spectrum to be enhanced. One can particularly accelerate these already rapid variations by elements of the reaction type (see French Pat. No. 1,411,717). FIG. 5 shows a typical application using the assembly of FIG. 3c; the capacity of the oscillator circuit 15 charges up if there is a component of its own natural frequency in the current spectrum of the power circuit 11. As soon as the threshold level of the Shockley diode is attained, there is a shock excitation of the transmitter oscillator circuit 17. In this way there is obtained on the one hand power amplification by storing energy in circuit 15, and on the other an independence between the frequency spectra respectively at the input and output.

An example of this use will now be given. In practice, when a fault appears in a power rectifier circuit, the first thing to happen is that the fuse blows (this is precisely its function) and after which the diode 11 (and any other diodes in series therewith) is in open circuit. It can be arranged that the selective circuit connected to the "current" (FIG. 3) transmits normally when the rectifier is working correctly; when the fuse blows, that is to say when there is no longer any current in the path in question, the transmission is interrupted.

It can equally well be arranged that said selective circuit connected to the reverse voltage (FIG. 4) transmits when the rectifier is working properly, and when it is not, the transmission ceases.

By combining the two, one can obtain an indication if the fuse or the diode is blown, or both are inoperable.

FIG. 6 shows an example of a complete apparatus having several channels. The oscillator circuit 17, 17' . . . $17^n$ are excited in series by the voltage across the fuses 12, 12' . . . $12^n$, and tuned to different frequencies in the frequency range where the spectrum has a maximum of current (FIG. 2). The inductances of the oscillator circuits have a core to facilitate coupling with the single receiving aerial 22. This aerial receives all the signals emitted, amplifies them in the receiver 23, and selects the different channels by frequency filters 24, 24' ... 24ⁿ. The output of each filter feeds an indicator 25, 25' ... 25ⁿ showing at each moment the state of the power circuit 11-12.

Instead of simultaneous display using frequency indication (frequency domain) it is also possible to use time distributed presentation (time domain), this last technique being specially useful in the case where the rectifiers are moving in rotation with respect to a small fixed receiving aerial. All the transmitters 17, 17' ... 17ⁿ can then be tuned to the same frequency and any appropriate index can be used with reference to time.

Clearly, besides the applications mentioned in which one seeks to detect a useful "on-off" signal, the principle of the invention can be used to obtain a proportional remote measurement or control. This is achieved automatically, by using amplitude modulation, by the very fact that for constant electric parameters, the amplitude of the transmitted signal is proportional to the signal to be measured (for example the current in a diode). One can also use a different modulation technique not subject to the disadvantages of amplitude modulation of which latter the transmission can be affected by attenuation and interference. For example, a frequency modulation can be used (by providing for example in the selective circuit (15-17) which determines frequency, instead of ordinary capacitors, a voltage dependant capacitor, and adding automatic biassing proportional to the high frequency voltage of the circuit).

FIG. 7 shows an example of one arrangement for operating according to this technique. The oscillator circuit 15 is excited by one of the variable voltage means previously described. Each voltage operating across the oscillator circuit is rectified by the diode 27, and filtered by the filter 28. Applied across the variable capacity diodes 26, it engenders a frequency shift which is a direct function of the amplitude of the alternating voltage across the circuit 15.

Again, pulse modulation can be used: for example in the selective circuit (15-17) there can be placed a resistance variable with the voltage which thus produces a damping of each wave train which is also variable with the voltage.

It will be seen that the natural oscillation effect, described above as due to charges stored in the diodes and to the leakage inductance of the feed circuit, can be used directly, in conjunction with one of the circuits of FIGS. 3 and 4. One can even change and adapt the frequency of the oscillations by adding external inductances or capacitances, possibly combined with the protection circuits of the diodes.

Moreover, the oscillation produced by the passive circuits described, can be considered as a signal carrier which would be modulated by a signal other than the waveform which produced it, in order to transmit a particular measurement.

As an example, one can use a heat-sensitive capacitor in the circuit (15-17) which determines the frequency. A remote measurement of the temperature is thus obtained directly, by using only passive circuits.

Finally, all the embodiments described can be varied either singly or in combination with each other or with the embodiments of the patents referred to, without departing from the scope of the present invention.

What I claim is:

1. In combination with an electric power system having a plurality of electronic switching elements, each said switching element, with its associated circuitry, having, when switched, a transient response containing characteristic high frequency components, the improvement comprising a control arrangement composed of a plurality of transmitting means each operatively connected to a respective one of said elements, each said means including a passive oscillator tuned to one of the high frequency components of its respective element, and radiating a signal at such high frequency.

2. An arrangement according to claim 1, wherein each said oscillator is tuned respectively to a natural frequency associated with each said element, said arrangement further comprising receiver means disposed at a distance from said transmitting means for receiving the radiated signals simultaneously, each in a different respective channel.

3. An arrangement according to claim 1, wherein each said oscillator is tuned to the same natural frequency, and the signals are received successively in a predetermined time-based sequence.

4. An arrangement according to claim 1, wherein the transmitted frequencies are in the high frequency range and are amplitude modulated.

5. An arrangement according to claim 1, wherein the transmitted frequencies are in the high frequency range and are frequency modulated.

6. An arrangement according to claim 1, wherein the transmitted frequencies are in the high frequency range and are pulse modulated.

7. In combination with an electric power system having a plurality of electronic switching elements, each said switching element, with its associated circuitry, having, when switched, a transit response containing characteristic high frequency components, the improvement comprising transmitting means operatively connected to at least one of said elements, said transmitting means including an input circuit composed of a passive oscillator tuned to one of the high frequency components of one said element and producing an output signal at such high frequency each time said element undergoes its normal transient response upon being switched, an output circuit tuned to a frequency different from that of said passive oscillator, and an active element connected between said input circuit and said output circuit for causing said output circuit to radiate a signal at the frequency to which it is tuned each time said passive oscillator produces a signal at the frequency to which it is tuned.

8. An arrangement according to claim 7, wherein said active element is a Shockley diode.

9. An arrangement as defined in claim 7 further comprising receiver means disposed at a distance from said transmitting means for receiving radiation produced by said output circuit and for producing an indication in response thereto.

10. An arrangement as defined in claim 9 wherein said transmitter means comprise a resonant circuit electrically linked to said element and tuned to a selected frequency in such frequency band for deriving electrical energy solely from said element and for converting the energy thus derived during switching of said element into a current oscillation at such selected frequency.

11. An arrangement as defined in claim 10 wherein said resonant circuit includes an element connected for being traversed by such oscillation and for converting it into said electromagnetic wave radiation.

References Cited

UNITED STATES PATENTS

| 3,125,753 | 3/1964 | Jones | 340—152UXT |
| 3,200,392 | 8/1965 | Chumakov | 340—253E |
| 3,223,889 | 12/1965 | Schweitzer | 325—113UX |

DONALD J. YUSKO, Primary Examiner

M. SLOBASKY, Assistant Examiner

U.S. Cl. X.R.

325—113; 340—152, 253